Feb. 26, 1963 A. J. FISHER 3,079,516

CONSTANT TEMPERATURE PIEZOELECTRIC CRYSTAL ENCLOSURE

Filed June 2, 1961 3 Sheets-Sheet 1

INVENTOR.

ALAN J. FISHER

BY [signature]

Charles A. Phillips

ATTORNEYS

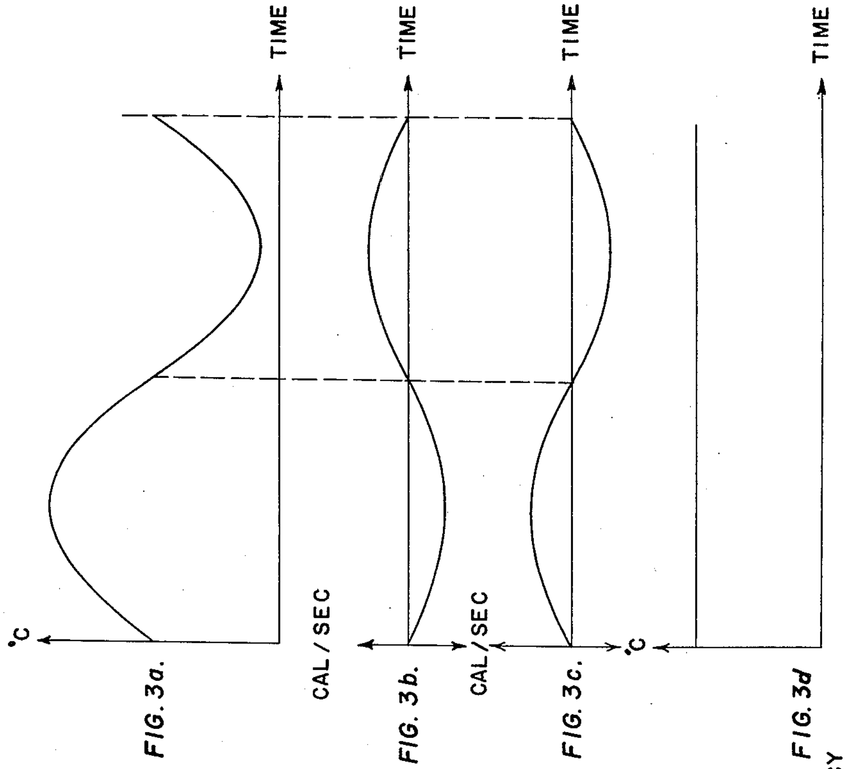
FIG. 3a. FIG. 3b. FIG. 3c. FIG. 3d
FIG. 3
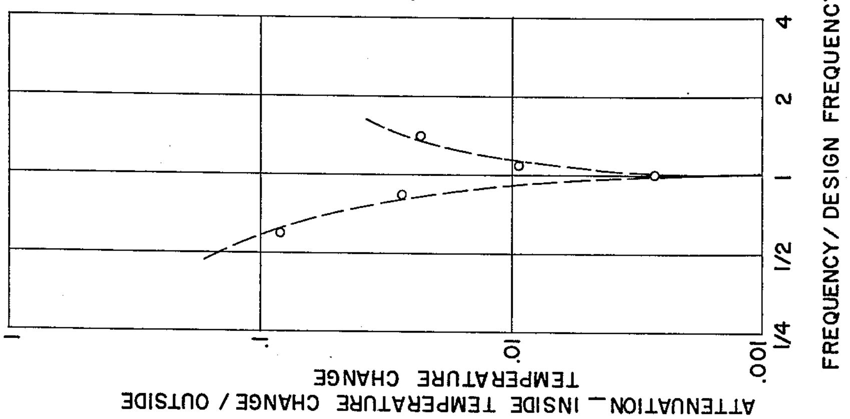
FIG. 2
INVENTOR.
ALAN J. FISHER
BY
[signature]
Charles A. Phillips
ATTORNEYS Feb. 26, 1963 A. J. FISHER 3,079,516

CONSTANT TEMPERATURE PIEZOELECTRIC CRYSTAL ENCLOSURE

Filed June 2, 1961 3 Sheets-Sheet 3

INVENTOR.
ALAN J. FISHER

BY [signature] [signature]
ATTORNEYS 3,079,516

CONSTANT TEMPERATURE PIEZOELECTRIC CRYSTAL ENCLOSURE

Alan J. Fisher, 2004 Colice Road, Huntsville, Ala.

Filed June 2, 1961, Ser. No. 114,569
5 Claims. (Cl. 310—8.9)
(Granted under Title 35, U.S. Code (1952), sec. 266)

The invention described herein may be manufactured and used by or for the Government of the United States of America for governmental purposes without the payment of any royalties thereon or therefor.

This invention relates to means for controlling the temperature within an enclosure and particularly to construction means for providing an enclosure which will maintain a constant inside temperature when the outside of the enclosure is subjected to periodic temperature variation.

There exists many instances in which the temperature within an enclosure must be maintained constant, or nearly so, despite a substantial periodic variation of temperature in the region surrounding the enclosure. One recent circumstance of this type and one which gave rise to the present invention involved the problem of maintaining the temperature constant of a piezo-electric crystal used for frequency control of a radio transmitter in a satellite orbiting the earth. In this environment an extreme periodic variation in temperature occurs as the orbiting satellite passes alternately in and out of view of the sun.

In the past the problem of maintaining a constant temperature for a crystal in more orthodox applications has been solved by the use of electrically heated and controlled ovens. However, in the present application electrical power for heating is not available due to other requirements for electrical power in the satellite, all of which are to be supplied by solar cells.

One approach to the solution of the problem would appear to be that of simply encasing the crystal within sufficient insulation to filter out the undersirable tempeature changes. This was attempted and found to be deficient, principally because of the heat leakage paths provided by electrical wires passing through the insulation to the crystal assembly. A variation of this approach was attempted in which in addition to insulating the crystal, it was encased in a high heat capacity material. This fell short for the same reason, a heat short circuit caused by electrical wires entering the enclosure. It thus appeared that conventional approaches were unsuitable.

Accordingly, it is the object of the present invention to provide a new means of temperature control which overcomes the difficulties heretofore encountered and provides an effective means of temperature control despite the presence of heat short circuits such as the one discussed.

It is a further object of this invention to provide an improved constant temperature frequency control device.

In accordance with the invention a temperature controlled enclosure is constructed in which the wall cross section of the enclosure consists of a low diffusivity material, diffusivity being a reciprocal index of the time required for heat to flow through a substance and equals the thermal conductivity divided by the product of the specific heat and the density of the substance. Filaments of high diffusivity material interconnect the inner and outer environments of the enclosure, that is pass through the low diffusivity material, and means are included for coupling heat from the terminals of the filaments to the adjacent environmental regions. One means of accomplishing this is by attaching the filaments to relatively large area highly thermally conductive metal surfaces positioned inside and outside the enclosure. In one embodiment of the invention these would take the form of metal sheets covering the walls of the low diffusivity material. The thickness of the low diffusivity material is dependent upon the diffusivity and the rate of periodic change in temperature which is to be experienced and is dimensioned to provide a heat transit time equal to one-half cycle of the periodic temperature variation. The filaments of high diffusivity material provide a second heat path and are of a type and cross section of a material sufficient to provide the same total heat flow between the sheets of cover material as does the low diffusivity material but differing in that substantially no time delay is introduced by them. The characteristics of this enclosure are that the outer high conductivity cover material provides an isothermic layer having the overall temperature of the environment and the inner high conductivity material layer provides an isothermic wall having substantially the same temperature as the interior of the enclosure. With the two heat paths, one of which is 180 degrees out of phase with the other, there is substantially a cancellation of net heat transfer. This condition will maintain as long as the outside temperature remains substantially a single frequency. While in practice there may be a number of temperature frequency components present, frequently one will be dominant and the only one requiring substantial treatment. Such is the case of an orbiting satellite in which there is a dominant temperature frequency corresponding to the orbital frequency.

When used in outer space the enclosure may be further surrounded by but separated from a reflective coated outer enclosure to provide still further insulation. The outer enclosure would have an opening to allow the vacuum of outer space to prevail between the enclosures. The reflective coating will of course reduce heat emission and the vacuum provide a low heat conductance path.

The features of my invention which are believed to be novel are set forth with particularity in the claims. The invention itself, both as to its organization and method of operation, together with further objects and advantages thereof, may be best understood by reference to the following description considered in conjunction with the accompanying drawings in which:

FIGURES 2 and 3 are graphs illustrating the operation of the assembly illustrated in FIGURE 1;

Figure 1:
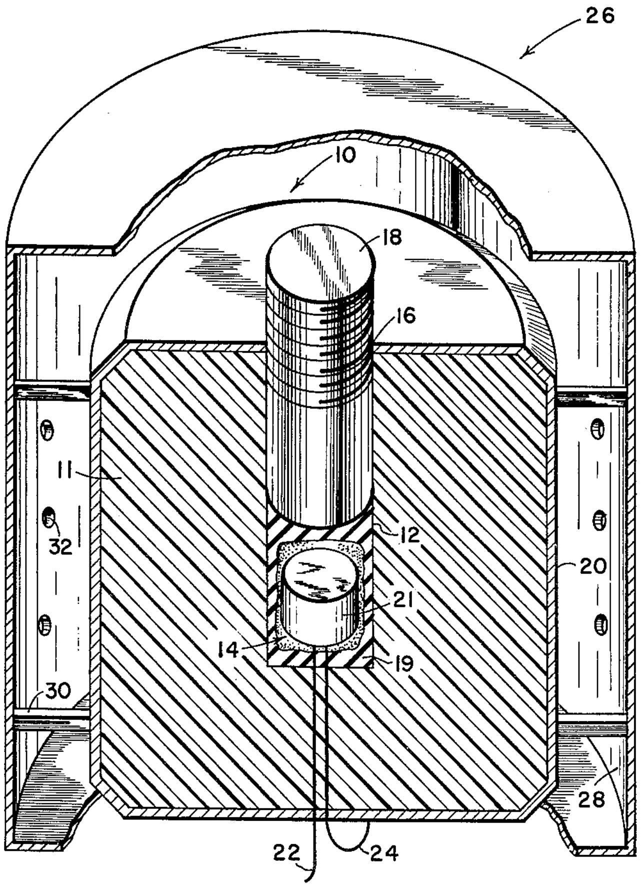
FIGURE 1 is a sectional view cut through the center of a crystal assembly enclosure.

Referring now to FIGURE 1, there is shown a cylindrical container or enclosure 10 for stabilizing the temperature of a piezoelectric crystal controlled oscillator to provide a constant frequency control system. The particular enclosure shown is 4.78 inches in diameter and length and includes an intermediate layer or core 11 of low diffusivity material surrounding a central cavity 12. As illustrated here, the enclosure is cut away to show the central cavity and the manner in which a piezoelectric crystal control assembly 14 is positioned in the cavity. The crystal control assembly is inserted into the cavity through an opening 16 at one end of the enclosure and a plug 18 is threaded to tighten down against the crystal assembly in the cavity (illustrated partially withdrawn). Cylindrical enclosure 10 and plug 18 are constructed of the same low diffusivity material. The particular material chosen here was a halofluorocarbon polymer now being marketed under the name Kel-F (diffusivity of $3.1\times10^{-4}$cm.$^2$/sec.) as this embodiment of the invention was designed for use in outer space and it became necessary to choose a low diffusivity material which would not out-gas in the vacuum to be encountered. A second low diffusivity material which will work well under normal atmospheric conditions is regenerated cellulose (diffusivity of $2.9\times10^{-4}$cm.$^2$/sec). The exterior of enclosure 10 is covered with a sheet 20 of high conductivity material such as polished gold to provide an isothermic layer or surface surrounding and engaging the outer surface of core 11. Similarly, the housing or chamber of crystal assembly 14 has as its outer layer or surface a sheet 21 of highly thermally conductive material to provide an interior isotherm. To facilitate a substantially total contact between the highly conductive outer surface layer of crystal assembly 14 and the low diffusivity core 11 a silicone rubber padding 19, also of low diffusivity, is placed around crystal assembly 14 and plug 18 is screwed down against the padding.

Crystal assembly 14, which in this embodiment is one inch in diameter and one inch long and may include only a crystal or more or less of a complete oscillator circuit, is interconnected with external electrical circuitry through a conductor or plurality of electrical conductors 22 passing through core 11 and isothermic sheets 20 and 21. Conductors 22 are of a high heat diffusivity characteristic material such as copper and thus provide a substantially no delay heat path. Another heat conductor, a filament of wire 24, one that is also of a high diffusivity material such as copper is interconnected between outer copper plate or sheet 20 and the cover sheet 21 of crystal assembly 14 to provide an additional no delay heat path. Conductors 22 and 24 provide the second heat path referred to above, and together are of a material and size as to provide the same net attenuation to heat flow, and thus conductance between crystal assembly 14 and the outside of the enclosure, as core 11. In this instance five operating cables 22 of No. 22 wire and one additional heat transfer wire 24 of No. 16 wire are employed.

The enclosure thus far described was designed for an operating temperature cycle of .52 cycle per hour to operate in a satellite with a 115 minute orbit. As a further feature of the invention, enclosure 10 is mounted in an outer enclosure or canister 26 which is 1½ inches in diameter and has an inner mirror surface 28, such as provided by a polished gold plate. Canister 26 supports enclosure 10 through low conductance supports 30 which provide a vacant space between the canister 26 and enclosure 10. Access holes 32 in the walls of the canister allow the environmental vacuum of outer space to prevail between the enclosure and canister to provide in effect a thermos bottle. The space occupied by supports 30 is small compared with the vacant space between enclosure 10 and canister 26. The additional insulation provided by the vacuum, together with the reflective surfaces of sheet 20 and canister 26 suppress harmonics of orbital temperature changes by an additional reduction of ten to one to reduce overall crystal temperature changes to be encountered to approximately .002 degree centigrade per orbit, an almost insignificant variation.

FIGURE 2 is a graph in which the ordinate axis, plotted logarithmically, represents the ratio of inside temperature amplitude to outside temperature amplitude (effective attenuation) and the abcissa axis the ratio of frequency of temperature change to the design frequency of enclosure 10 illustrated in FIGURE 1. The extreme dip at unity, the design frequency, illustrates the unusual effectiveness of enclosure 10 alone.

FIGURE 3 further illustrates the operation of the invention. FIGURE 3*a* is a plot of environmental temperature vs. time after at least one-half cycle periodic change, after which the invention is operable. FIGURE 3*b* is representative of heat passage into and out of the crystal chamber 14 by virtue of heat transfer through the low diffusivity path, with the portion above the horizontal axis representative of heat transfer into the chamber and the portion below the axis representative of heat transfer out of the chamber. FIGURE 3*c* is a similar plot for heat transfer into and out of the chamber through the wire, no delay, path. FIGURE 3*d* is representative of the constant temperature in the crystal chamber as a result of the cancellation of the heat transfer effects illustrated by FIGURE 3*b* and 3*c*.

In addition to the enclosure assembly illustrated by FIGURE 1, the invention is well adapted to provide enclosures for many other purposes. An example would be a moon dwelling for man or instruments. In such an application, walls approximately 3¾ feet thick made of foil covered low diffusivity material shunted with occasional metal rods added to equal the conductance of the low diffusivity material which equality will be noted from a pronounced dip in temperature variation in the otherwise temperature extremes of the lunar day and night.

Figure 4:
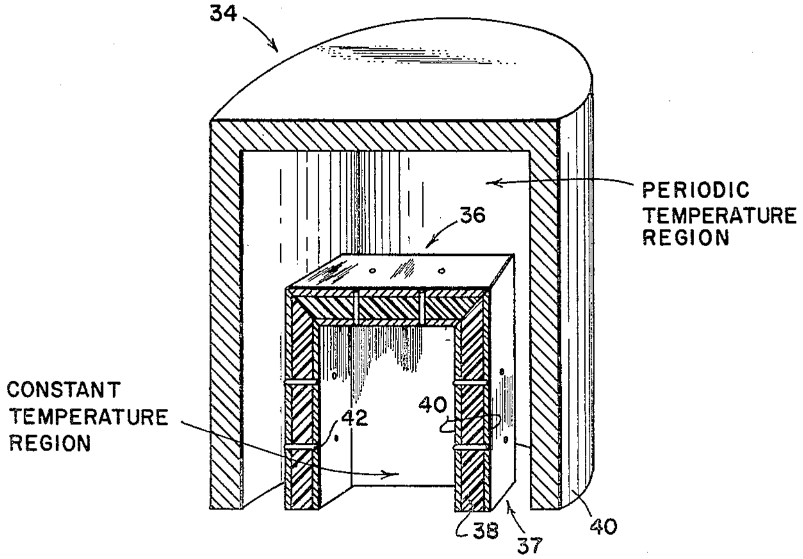
FIGURE 4 is a sectional view cut through a central portion of a temperature control enclosure within a periodic temperature enclosure.
Figure 5:
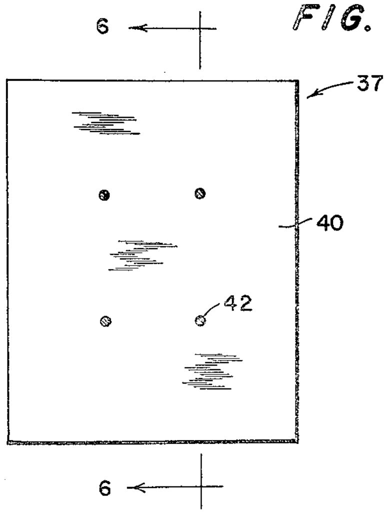
FIGURE 5 is an elevation view of a wall panel embodying the invention.
Figure 6:
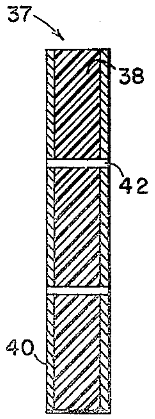
FIGURE 6 is a sectional view of FIGURE 5 along the lines 6—6.

Other applications not quite as exotic exist elsewhere, as in certain industrial processes which require a first region where there is a pronounced periodic variation in temperature and where there is a requirement that a second region in the vicinity of the first be maintained at a constant temperature. This circumstance is illustrated in FIGURE 4 in which outer enclosure 34 houses, or substantially houses, a region of periodic temperature variation within which it is desired to provide a region of constant temperature. In accordance with the invention, a constant temperature enclosure 36 is constructed within outer enclosure 34 and thus enclosure 36 is surrounded or substantially surrounded by a periodic temperature region. Walls 37 having a core 38 of low diffusivity material, such as regenerated cellulose, are covered on both inner and outer surfaces with a thin layer of highly conductive material 40 such as metal foil to provide inner and outer isothermic layers. A quantity of highly thermally conductive material such as metal rods 42 thermally interconnect through core 38 the layers of foil. As explained above the thickness of the low diffusivity core material would be adjusted in terms of the diffusivity to provide a transit time equal to one-half cycle of temperature change, and the cross section of metal rods, high diffusivity paths, would be adjusted to provide for the same total attenuation, or conductance, to heat flow as the core material but with a substantially higher diffusion rate than the core material. The wall sections of enclosure 36 may be prefabricated into wall panels 37 as illustrated in FIGURES 5 and 6. In this instance low diffusivity core material 38, foil covering 40, and the rods 42 interconnecting the foil would be selected and assembled in terms of the frequency to be encountered. The thickness of the panels would be proportional to the square root of the diffusivity of the core material and inversely proportional to the square root of the design frequency. Because of the one-half power relation very slow periodic changes, e.g. covering several hours, can be filtered with surprisingly thin panels. These panels can be substantially accurately determined from the following equations which are in terms of panel dimensions and known panel material parameters:

$$L=5.55\sqrt{\frac{d}{2\pi f}}$$

where:

$L$=wall thickness in centimeters
$d$=diffusivity of material in delayed path=

$$\frac{k}{pc}$$

$p$=density of low diffusivity material (grams/cm.$^3$)

$k$=conductivity of low diffusivity material (heat flow in calories between faces of a cm.$^3$ of the material per second per degree centigrade difference in temperature between these faces)

$c$=specific heat of low diffusivity material (calories required to raise a cm.$^3$ of the material one degree centigrade)

$f$=the frequency of periodic temperature change to be filtered out.

$$K_d = \frac{k_t}{4.62}$$

where:

$K_d$=conductance of direct path (calories per second per degree centigrade)

$k_t$=conductance of delayed path=

$$\frac{ka}{L}$$

$a$=panel area normal to heat flow

It is understood that the above-described embodiment is merely illustrative of the principles of the invention. Numerous other arrangements might be devised by those skilled in the art without departing from the spirit and scope of the invention.

What is claimed is:

1. The combination comprising a piezoelectric crystal control assembly, a sheet of highly thermally conductive material forming an outer housing of said assembly, a layer of low diffusivity material substantially totally surrounding and engaging the outer surface of said sheet, a second sheet of highly thermally conductive material surrounding and engaging the outer surface of said low diffusivity material, a filament of high diffusivity material interconnecting said sheets, and electrical conductors of high diffusivity passing through said layer and sheets, said electrical conductors and said filament being of a conductivity and cross section to provide substantially the same net attenuation to heat flow as said layer.

2. The combination set forth in claim 1 further comprising a canister surrounding said combination, supporting means for interconnecting said second sheet with said canister for supporting said combination, said supporting means providing a vacant spaced relation between said second sheet and said canister except as occupied by said supporting means, said space occupied by said supporting means being small compared to the vacant space between said second sheet and said canister the inner wall of said canister and the outer surface of said second sheet being reflective and means for maintaining the same atmospheric pressure in said vacant space as exists on the outside of said canister.

3. A constant temperature crystal container comprising an inner crystal chamber and an outer enclosure surrounding said crystal chamber, a highly thermally conductive layer forming the outer surface of said crystal chamber, said outer enclosure comprising a thickness of low diffusivity material substantially totally contacting said conductive layer and a second highly thermally conductive layer covering the outer surface of said low diffusivity material, a substantially no delay thermally conductive means extending through said outer enclosure and including a conductive path interconnecting said thermally conductive layers, said means providing substantially the same thermal attenuation as said low diffusivity material.

4. In combination, a region of periodic temperature variation and a constant temperature enclosure, the outside of said enclosure being substantially surrounded by said region, said constant temperature enclosure comprising walls having a core of low diffusivity material, a first isothermic layer covering the outer surfaces of said core of low diffusivity material and a second isothermic layer covering the inner surfaces of said core of low diffusivity material, the thickness and the diffusivity of said low diffusivity material being adjusted to provide a thermal delay through said low diffusivity material equal to one-half cycle of said periodic temperature variation, one or more high diffusivity heat paths offering substantially no-thermal delay interconnecting said first and second layers, said heat paths providing a total heat conductance equal to the total conductance by said core of low diffusivity material.

5. An insulating panel comprising a thickness of low diffusivity material, first and second isothermic layers joined to and separated by said thickness of low diffusivity material, a quantity of highly thermally conductive material extending through said thickness of low diffusivity material and thermally connecting said isothermic layers, said quantity of highly thermally conductive material having the same thermal conductance but a substantially higher diffusion rate than said thickness of low diffusivity material.

References Cited in the file of this patent

UNITED STATES PATENTS

| | | |
|---|---|---|
| 1,782,045 | Mason | Nov. 18, 1930 |
| 1,994,983 | De Florez et al. | Mar. 19, 1935 |
| 2,050,633 | Stallard | Aug. 11, 1936 |
| 3,013,104 | Young | Dec. 12, 1961 |

FOREIGN PATENTS

| | | |
|---|---|---|
| 700,180 | France | Feb. 25, 1931 |